(12) United States Patent
Kim et al.

(10) Patent No.: US 9,097,927 B2
(45) Date of Patent: Aug. 4, 2015

(54) MOBILE TERMINAL

(75) Inventors: Jeongho Kim, Anyang (KR); Soowook Jang, Seoul (KR); Kyunghee Yoo, Suwon (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 13/476,664

(22) Filed: May 21, 2012

(65) Prior Publication Data

US 2012/0300142 A1    Nov. 29, 2012

(30) Foreign Application Priority Data

May 24, 2011  (KR) ........................ 10-2011-0049183

(51) Int. Cl.
*G02F 1/1333*   (2006.01)
*G02B 27/22*    (2006.01)

(52) U.S. Cl.
CPC ........ *G02F 1/13338* (2013.01); *G02B 27/2214* (2013.01)

(58) Field of Classification Search
None
See application file for complete search history.

(56) References Cited

U.S. PATENT DOCUMENTS

| | | | |
|---|---|---|---|
| 6,590,605 B1 * | 7/2003 | Eichenlaub | 348/51 |
| 2007/0103547 A1 * | 5/2007 | Kim et al. | 348/55 |
| 2008/0030634 A1 * | 2/2008 | Aramatsu | 349/15 |
| 2009/0135356 A1 * | 5/2009 | Ando | 349/137 |
| 2010/0035745 A1 * | 2/2010 | Murata | 501/66 |
| 2010/0119846 A1 * | 5/2010 | Sawada | 428/426 |
| 2012/0025245 A1 * | 2/2012 | Nakamura et al. | 257/98 |

FOREIGN PATENT DOCUMENTS

| | | |
|---|---|---|
| KR | 10-2009-0054650 | 6/2009 |
| KR | 10-2009-0026249 | 3/2012 |

OTHER PUBLICATIONS

Bo et al., High-Refractivity Low-Dispersion Optical Glass for Precise Press Molding, May 12, 2009, Machine Translation of KR 10-2009-002649 A from KIPO website, All pages.*
Min et al., The Method Which Can Reduce Ghost and Oil in the Stereocopic Parallax LCD Barrier, Jun. 1, 2009, Machine Translation of KR 10-2009-0054650 A from KIPO website, All pages.*
Korean Office Action dated Jun. 18, 2012 for Application 10-2011-0049183.

* cited by examiner

*Primary Examiner* — Dennis Y Kim
(74) *Attorney, Agent, or Firm* — KED & Associates LLP

(57) ABSTRACT

A display module includes: a main liquid crystal panel having a plurality of pixel regions formed on a surface thereof so as to display visual information; a barrier panel spaced a predetermined gap from the surface in the thickness direction so as to cover the surface of the main liquid crystal panel; and a refractive portion including at least one glass substrate so as to fill the gap. The freedom of design may be increased since the display module can maintain a prescribed thickness, and the portability may be improved by increasing rigidity.

16 Claims, 5 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0049183, filed on May 24, 2011, the contents of which is incorporated by reference herein in its entirety.

BACKGROUND OF THE INVENTION

1. Field of the Invention

The present disclosure relates to a mobile terminal including a display module for reproducing second-dimensional and three-dimensional images.

2. Background of the Invention

Terminals may be divided into mobile/portable terminals and stationary terminals according to their mobility. Also, the portable terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player.

Recently, interest in stereoscopic image displays is growing, and a variety of products for implementing them are being released.

Stereoscopic images may be roughly divided into spatial three-dimensional images using holography and stereographs using the difference in angle between a left image and a right image that the eyes are pointing. In one of the method for implementing stereography, a parallax barrier may be used to realize 3D. The parallax barrier method uses the principle that a parallax is generated between the eyes of a viewer by placing a filter with vertical slits in front of a display apparatus.

However, in order to deliver XGA-level resolution on a display panel for both 2D and 3D with a screen size of 8.9 inches or greater, the rear distance from a color filter to a barrier needs to be equal to or greater than a predetermined value or more, which has been difficult to perform by a conventional method.

SUMMARY OF THE INVENTION

Therefore, an aspect of the detailed description is to provide a display module in which the rear distance from color filters to barriers is equal to or greater than a prescribed distance.

Another aspect of the detailed description is to provide a display module including a refractive portion with a prescribed refractive index or more which is laminated so that the rear distance is maintained.

To achieve these and other advantages and in accordance with the purpose of this specification, as embodied and broadly described herein, a display module according to an embodiment of the present invention includes: a main liquid crystal panel having a plurality of pixel regions formed on a surface thereof so as to display visual information; a barrier panel spaced a predetermined gap from the surface in the thickness direction so as to cover the surface of the main liquid crystal panel; and a refractive portion including at least one glass substrate so as to fill the gap, wherein the barrier panel includes barriers that are disposed to cover at least part of color filters forming the pixel regions and are disposed to be spaced apart from each other to define slits at prescribed intervals, and the glass substrate contains predetermined percentages by weight of $Nb_2O_5$, BaO, and $TiO_2$.

In an embodiment related to the present invention, the refractive portion may further include at least one polarization layer, and the polarization layer may include an intermediate layer of an inorganic material.

In an embodiment related to the present invention, the inorganic material may be formed by a material selected from the group consisting of SiO, $SiO_2$, $Al_2O_3$, $ZrO_2$, $TiO_2$, $GeO_2$, and mixtures and combinations thereof.

In an embodiment related to the present invention, the barrier panel includes barriers that are disposed to cover at least part of color filters forming the pixel regions and spaced apart from each other to define slits at preset intervals.

In an embodiment related to the present invention, the glass substrate may have a predetermined refractive index (n), and the refractive index (n) may be $1.8 \leq n \leq 2.3$.

In an embodiment related to the present invention, the refractive portion is disposed to be spaced apart at prescribed distances (d) in the thickness direction extending from the color filters to the barriers, and the distances are $0.55 \text{ mm} \leq n \leq 0.75 \text{ mm}$.

In an embodiment related to the present invention, the refractive portion may further include at least one adhesion layer, and the adhesion layer may be formed of an organic or inorganic adhesion layer containing glass fibers.

To achieve these and other advantages and in accordance with the purpose of this specification, as embodied and broadly described herein, a mobile terminal according to an embodiment of the present invention includes: a terminal body; and a display module incorporated in the terminal body and displaying image information, the display module including: a main liquid crystal panel having a plurality of pixel regions formed on a surface thereof so as to display visual information; a barrier panel spaced a predetermined gap from the surface in the thickness direction so as to cover the surface of the main liquid crystal panel; and a refractive portion including at least one glass substrate so as to fill the gap, wherein the barrier panel includes barriers that are disposed to cover at least part of color filters forming the pixel regions and are disposed to be spaced apart from each other to define slits at prescribed intervals, and the glass substrate contains predetermined percentages by weight of $Nb_2O_5$, BaO, and $TiO_2$.

To achieve these and other advantages and in accordance with the purpose of this specification, as embodied and broadly described herein, a mobile terminal according to an embodiment of the present invention includes: a terminal body; a main liquid crystal panel incorporated in the terminal body, and having a plurality of color filters spaced apart from each other and alternately disposed in a first direction to define a pixel; a barrier panel including slits for transmitting light emitted from the display panel and barriers arranged in the first direction so as to realize a 3D image; and a refractive portion disposed to space the main liquid crystal panel and the barrier panel apart from each other, wherein the refractive portion includes a plurality of layers, and the refractive index (n) of at least one of the layers is $1.8 \leq n \leq 2.3$.

The thus-configured display module related to at least one of the embodiments of the present invention can offer a resolution increase because of its high refractive index.

According to the present invention, the freedom of design may be increased since the display module can maintain a prescribed thickness, and the portability may be improved by increasing rigidity.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Hereinafter, a display module related to the present invention and a mobile terminal including the same will be described in more detail with reference to the drawings. For the sake of brief description with reference to the drawings, the same or equivalent components will be provided with the same reference numbers, and description thereof will not be repeated. Singular expressions include plural expressions which do not have any obviously different meaning in view of a context.

The suffixes "module" and "unit or portion" for components used in the following description merely provided only for facilitation of preparing this specification, and thus they are not granted a specific meaning or function.

The mobile terminal described in the specification can include a cellular phone, a smart phone, a laptop computer, a digital broadcasting terminal, personal digital assistants (PDA), a portable multimedia player (PMP), a navigation system and so on. However, those skilled in the art will easily understand that configurations according to embodiments of the present disclosure can also be applied to stationary terminals such as digital TV and desktop computers except a case where the configurations can be applied to only mobile terminals.

Figure 1:
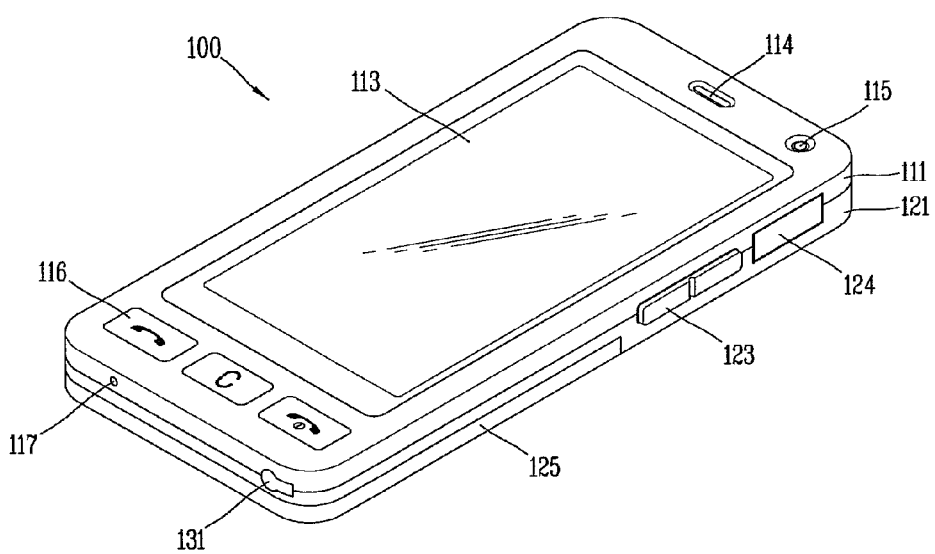
FIG. 1 is a perspective view of a mobile terminal related to an embodiment of the present invention.

FIG. 1 is a perspective view of a mobile terminal 100 related to an embodiment of the present invention when viewed from the front.

A case (a casing, a housing, a cover, etc.) forming the exterior of the body of the terminal is formed by a front case 111 and a rear case 121. Electronic components are disposed in a space formed by the front case 111 and the rear case 121. At least one intermediate case may be additionally disposed between the front case 111 and the rear case 112. The cases may be formed of a synthetic resin in a manner of injection, or formed of a metallic material such as stainless steel (STS) or titanium (Ti).

A display 113, a first audio output unit 114, a first image input unit 115, a first manipulation portion 116, and an audio input unit 117 may be disposed at the front case 111.

The display 113 includes a display module 200 (see FIG. 3) such as a Liquid Crystal Display (LCD) module, an Organic Light Emitting Diodes (OLED) module, etc., to visually represent information.

The display 113 may further include a touch screen so that the user can input information by touch.

The first audio output unit 114 may be implemented as a receiver or a speaker.

The first image input unit 115 may be implemented as a camera module for shooting an image or moving picture for the user. The first manipulation portion 116 is configured to receive a command for controlling an operation of the mobile terminal 100 related to an embodiment of the present invention.

The first audio input unit 125 may be implemented, for example, as a microphone to receive user's voice or other sounds.

The rear case 121 mounted on the rear surface of the mobile terminal 100 may be provided with a second manipulation portion 123, an interface 124, a power supply unit 125, etc.

The second manipulation portion 123 may be disposed on a side surface of the rear case 121.

The first and second manipulation portions 116 and 123 may be broadly referred to as a manipulation portion, which can be adapted or implemented in any manner, such as a tactile manner that the user can touch for manipulation.

For example, the manipulation portion may be implemented as a dome switch, the touch screen or a touch pad by which the user can input commands or information by push or touch thereof. Alternatively, the manipulation portion may be implemented, for example, as a wheel, a jog, or a joystick.

Functionally, the first manipulation portion 116 is configured to input commands such as start, end, or the like, and the second manipulation portion 123 can work as a hot key which performs a specific function, such as activating the first image input unit 115, as well as the scroll function.

If the first and second manipulation portions 116 and 123 are minimized as illustrated herein, phone numbers, text, etc. can be input through a touch screen provided at the display 113.

The interface 124 serves as a path which allows the mobile terminal 100 to exchange data with external devices. For example, the interface 124 may be used in a wired or wireless manner, and may be at least one of a connection terminal to which an earphone is connected, a port for a local communication (e.g., infrared data (IrDA) port, Bluetooth port, wireless Lan port, etc.), or a power supply terminal for supplying power to the mobile terminal 100. The interface 124 may be a card socket for receiving an external card such as a Subscriber Identification Module (SIM), a User Identity Module (UIM) or a memory card for storing information, etc.

The power supply unit 125 is mounted at the rear case 121 so as to supply power to the mobile terminal 100.

The power supply unit 125 may be implemented as a rechargeable battery, for example, and be detachably coupled to the mobile terminal for charging and discharging operations.

Figure 2:
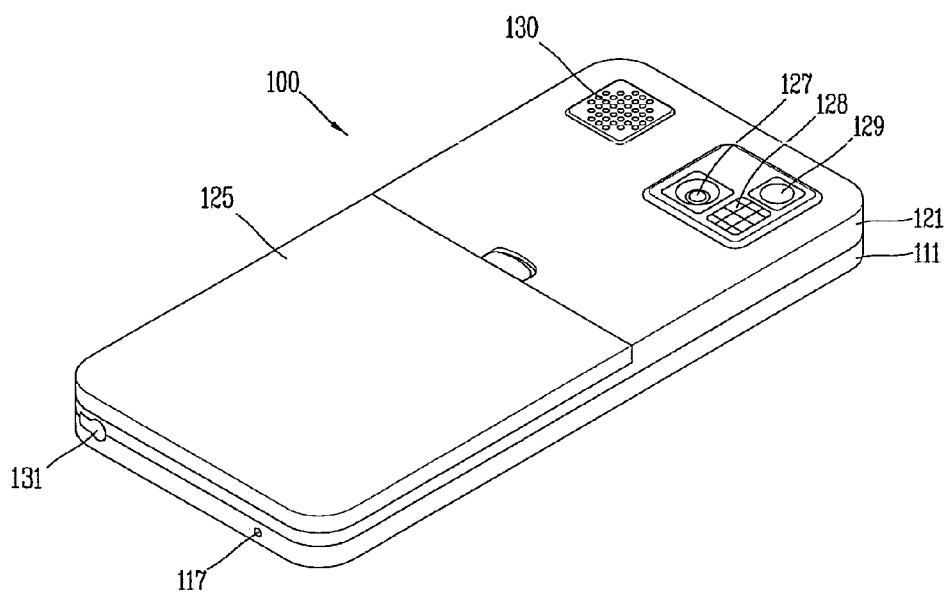
FIG. 2 is a rear perspective view of a mobile terminal related to an embodiment of the present invention.

FIG. 2 is a rear perspective view of the mobile terminal 100 of FIG. 1.

Referring to FIG. 2, a second image input unit 127, a second audio output unit 130, a broadcast signal receiving antenna 131, etc. may be additionally disposed at the rear case 121.

The second image input unit 127 has a shooting direction substantially opposite to a direction of the first image input unit 115 (see FIG. 1). The second image input unit 128 may be implemented as a camera having a pixel density different from that of the first image input unit.

For example, the first image input unit 115 has low pixel density so that an image of the user's face can be captured and then transmitted without any problem in case of a video call, while the second image input unit 127 preferably has high pixel density since it is mainly used for when an image of a general object is captured but the image is not immediately transmitted.

A flash 128 and a mirror portion 129 may be additionally disposed adjacent to the second image input unit 127. When capturing an object by using the second image input unit 127, the flash 128 throws a flash of light on the object. When the user captures an image of himself/herself by using the second image input unit 127, the mirror portion 129 can be used for the user to look at himself/herself therein.

The second audio output unit 130 may be implemented as a stereo together with the first audio output unit 114 (see FIG. 1) or may be used to talk in a speakerphone mode.

At least one side of the rear case 121 may be provided with the antenna 131 for receiving broadcast signals in addition to an antenna for communication. The antenna 131 may be installed to be extendable from the rear case 121.

So far, it is explained that the first manipulation portion 116, etc. is mounted on the front case 111 and the second manipulation portion 123, etc. is mounted on the rear case 121. However, such is not limited thereto. For example, the second manipulation portion 123 may be disposed at the front case 111 so as to be adjacent to the first manipulation portion 116.

Further, even if the second image input unit 127 is not provided, since the first image input unit 115 is rotatably formed, it may be configured to be capable of shooting in a direction that includes a shooting direction of the second image input unit 127.

Figure 3:
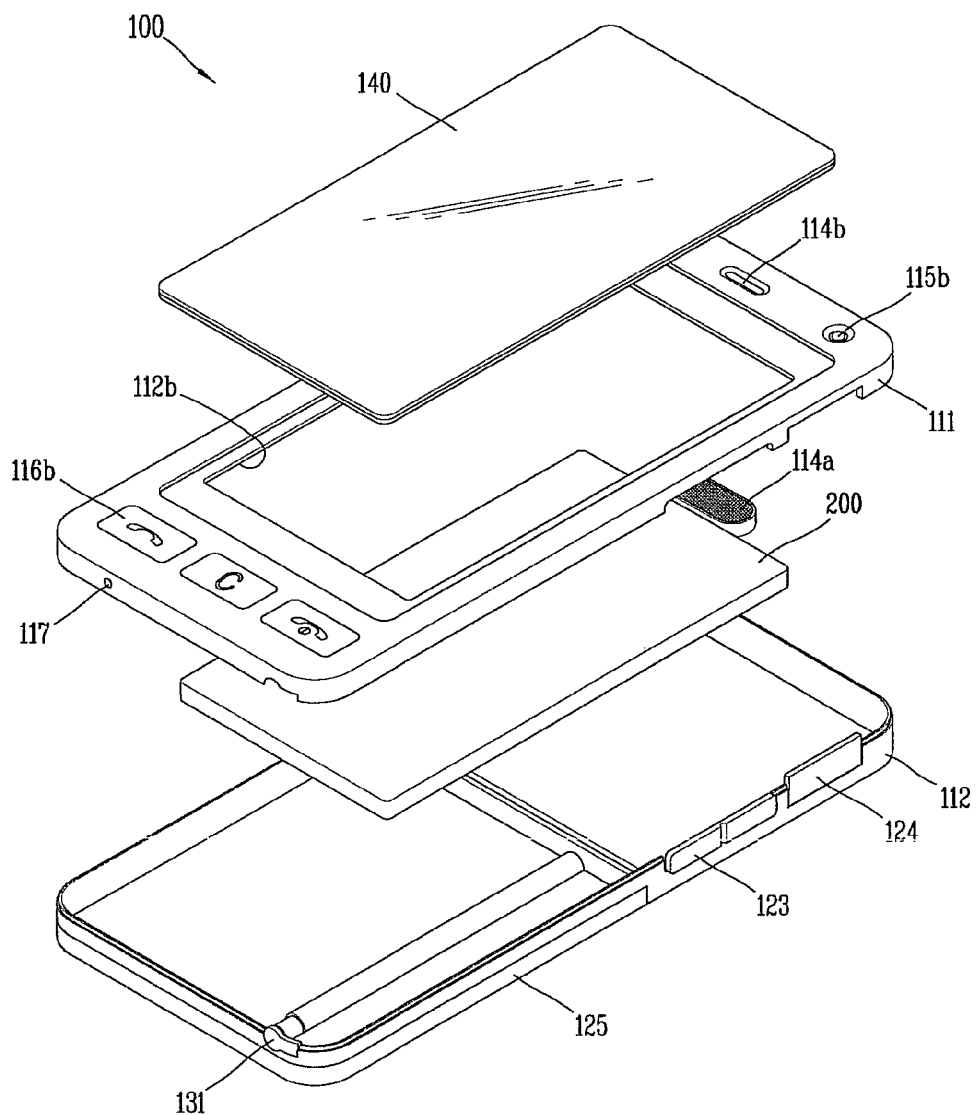
FIG. 3 is an exploded perspective view of the mobile terminal 100 of FIG. 1.

FIG. 3 is an exploded perspective view of the mobile terminal 100 of FIG. 1.

Referring to this drawing, a window 140 is coupled so as to cover one surface of the front case 111. The window 140 covers one surface of the display module 200 so that visual information output from the display module 200 is recognized from the outside. The display module 200 and the window 140 constitute the display 113 (see FIG. 1).

The window 140 may be configured to recognize a user's touch. In this case, the window 140 may receive an input of information (e.g., a command, a signal, and the like) by a user's touch.

The window 140 may have an area corresponding to the display module 120 and is formed of a light transmitting material. The window 140 may have an opaque region where light is not transmitted or light transmission rate is very low. For instance, edges of the window 140 may undergo a surface treatment for blocking any light transmission.

A manipulation pad 116a may be formed on the front case 111, in correspondence to the first manipulation portion 116. The manipulation pad allows the user to perform a touch or press operation thereon.

The manipulation pad may function as a manipulation area at a portion of the window 140.

A sound hole 114b, a window hole 112b, and a video window may be formed at the front case 111.

The sound hole 114b is formed to correspond to the audio output unit 114, and outputs audio sounds (e.g., ringtones, music, and the like) of the mobile terminal to the outside. The window hole 112b may be formed to correspond to the display 113. A light-transmissive image window may be formed to correspond to the first image input unit 115 (see FIG. 1).

The display module 200, a speaker module 114a, a camera module 115a, and a switch may be mounted on the rear case 121.

Figure 4:
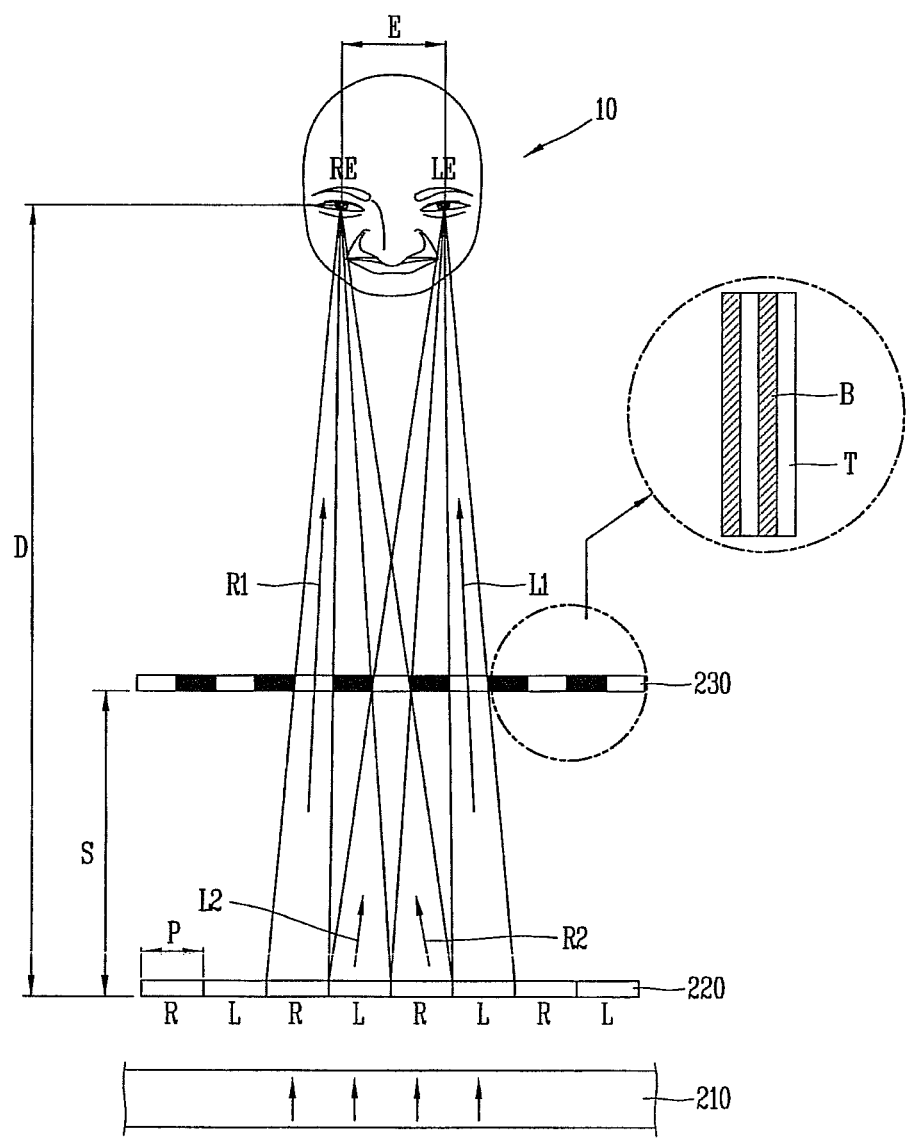
FIG. 4 is a conceptual diagram of a stereoscopic image display method related to an embodiment of the present invention.
Figure 5A:
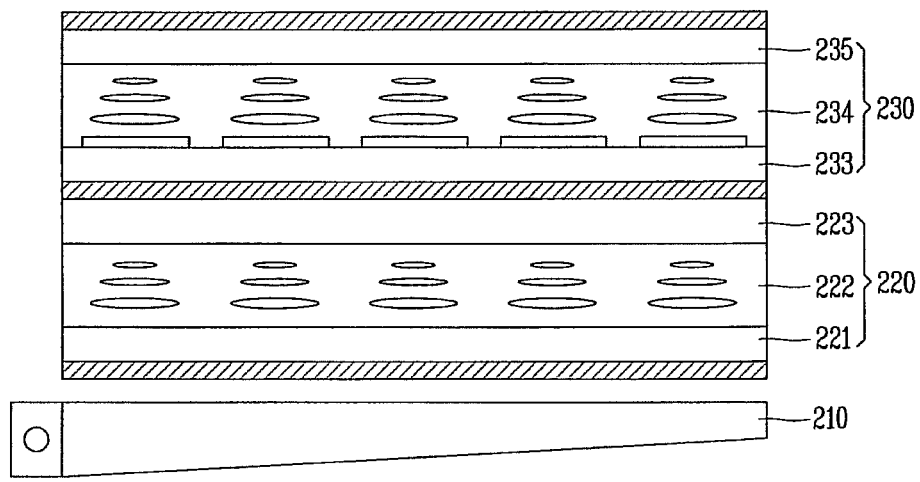
FIGS. 5A and 5B are conceptual diagrams of 2D and 3D operation modes of a display module related to an embodiment of the present invention.
Figure 5B:
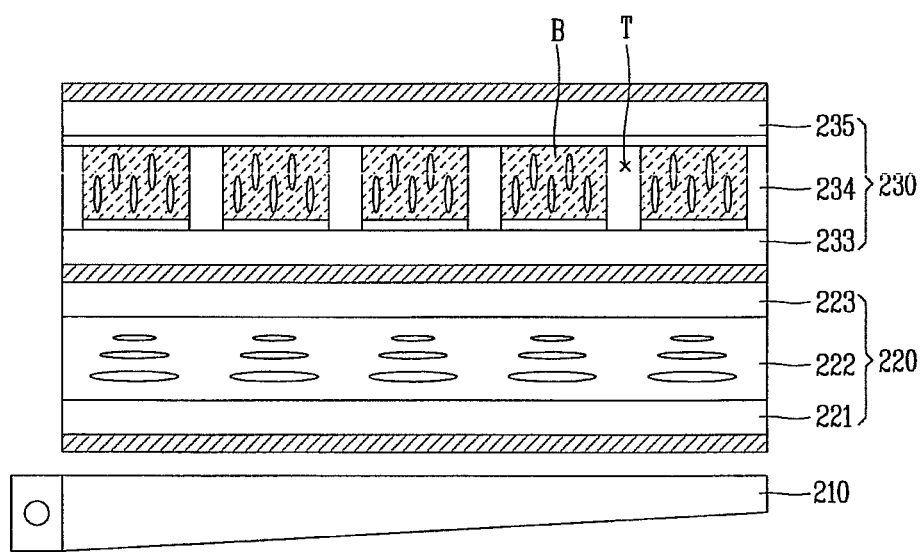

FIG. 4 is a conceptual diagram of a stereoscopic image display method related to an embodiment of the present invention. FIGS. 5a and 5b are conceptual diagrams of 2D and 3D operation modes of a display module related to an embodiment of the present invention.

The display module 200 according to an embodiment of the present invention includes a main liquid crystal panel 220 and a barrier panel 230. Although descriptions of the elements such as a case and a driver are omitted, it does not mean that the omitted elements are not necessary for embodying the invention.

Left-eye pixels L for displaying image information for the left-eye and right-eye pixels R for displaying image information for the right eye are alternately formed on the main liquid crystal panel 220. A backlight 210 may be disposed at the backside of the main liquid crystal panel 220 to supply light.

The backlight 210 may be used as a source of images to be provided to the user through the main liquid crystal panel 220 and the barrier panel 230. The backlight 210 is disposed in such a manner as to enclose the outer surface of a first substrate 221 of the main liquid crystal panel 220 or the side surface of the main liquid crystal panel 220, and supplies light to the main liquid crystal panel 220 through a light guide plate (not shown). The backlight 210 may include a light guide plate (not shown), a light source, a reflective plate, and an optical sheet. Particularly, the light source may be configured by using, but not limited to, a PDP, an OLED, an LED, a cold cathode ray tube, and a mechanism having the same function as those listed above.

A detailed description of the backlight 210 will be omitted because a variety of techniques associated with the backlight 210 are well known.

A parallax barrier panel 230 is disposed between the main liquid crystal panel 220 and an observer 10 or between the main liquid crystal panel 220 and the backlight 210 to transmit and block light at predetermined positions, and consists of slit portions T and barrier portions B for selectively transmitting and blocking light emitted from the left- and right-eye pixels L and R. The slit portions T and the barrier portions B alternate with each other.

Of light emitted from the backlight 210, light L1 passed through the left-eye pixels L of the main liquid crystal panel 100 reaches the left eye LE of the observer 10 via the slit portions T of the parallax barrier panel 230, and light R1 passed through the right-eye pixels R of the main liquid crystal panel 220 reaches the right eye RE via the slit portions T of the parallax barrier panel 230. The image displayed through the left- and right-eye pixels includes enough parallax information for the observer to be consciously aware of it, thus making it possible for the observer 10 to recognize the 3D stereoscopic image.

In the 2D mode, the barrier panel 230 transmits light across the entire surfaces without performing any operation. On the other hand, in the 3D mode, a transparent zone functioning as the slit portions B for transmitting light and a barrier zone functioning as the barrier portions T for blocking light appear in stripes.

As shown in FIGS. 5A and 5B, the main liquid crystal panel 220 includes a pair of first and second substrates 221 and 223 attached together so that they face each other, with a liquid crystal layer 222 interposed therebetween.

A plurality of pixels with their own orientations may be arranged between the two substrates 221 and 223. Each of the pixels may include a transparent pixel electrode of the first substrate 221 and a transparent common electrode of the second substrate 223 may be disposed to face each other, with liquid crystals interposed therebetween.

An image signal voltage may be selectively applied to the pixel electrode by a corresponding thin film transistor (TFT). The second substrate 223 is provided with red, green, and blue (RGB) color filters and a black matrix filling the gaps between the RGB color filters, for example, corresponding to each pixel, and the common electrode is formed to cover the black matrix.

Accordingly, when an image signal voltage is applied to the pixel electrode of a selected pixel by the switching operation of the thin film transistor, a voltage difference is generated between the pixel electrode and the common electrode, and this drives liquid crystal molecules having optical anisotropy and polarization properties, thereby producing difference in transmittance. As light of the backlight 210 passes through the main liquid crystal panel 220, a variety of planar color images are displayed in accordance with a difference in transmittance between the pixels and a color combination of the RGB color filters. Although an LCD panel is used as the main liquid crystal panel 220 by way of example, a Braun tube, a plasma display panel, an OLED display panel, and other display panels may also be used to implement the main liquid crystal panel.

Although the barrier panel 230 includes first and second barrier substrates 233 and 235 bonded together to face each other, with a second liquid crystal 234 interposed therebetween, the barrier panel 230 is different from the main liquid crystal panel 220 in that, for every pixel, a transparent barrier electrode is formed on an inner surface of the first barrier substrate 233 and a transparent common electrode is provided on an inner surface of the second barrier substrate 235. If the liquid crystal layer 234 is formed in a twisted nematic type, a liquid crystal driving voltage is applied to the barrier electrode in the 3D mode only.

Moreover, in the display module 200, for example, polarization plates may be respectively attached to an outer surface of the second substrate 223 of the main liquid crystal panel 220, between the main liquid crystal panel 220 and the barrier panel 230, and to the backside of the first barrier substrate 233 of the barrier panel 230.

As such, the display module 200 including the barrier panel 230 maintains a normal white condition across the entire surfaces of the barrier panel 230 in the 2D mode of FIG. 5A in which no voltage is applied to the barrier electrode of the barrier panel 230 and merely transmits light emitted from the backlight 210. As a result, the viewer can see a planar image of the main liquid crystal panel 220. While the description given herein is about normal white, normal white and normal black may be selectively formed in accordance with the display ratio between 2D and 3D.

On the other hand, in the 3D mode of FIG. 5B in which a liquid crystal driving voltage is applied to the barrier electrode, only liquid crystals between the barrier electrode and the common electrode are driven. Thus, the corresponding portions serve as a barrier zone for displaying black to block light, and the portions formed therebetween serve as a transparent zone for displaying white to transmit light. Consequently, the barrier zone and the transparent zone function as the barrier portions B and the slit portions T, respectively, thus allowing the observer to recognize an image of the main liquid crystal panel 220 in a stereoscopic manner.

As such, the display module 200 is able to switch between the 2D and 3D modes by on/off operations of the barrier electrode of the barrier panel 230.

Figure 6:
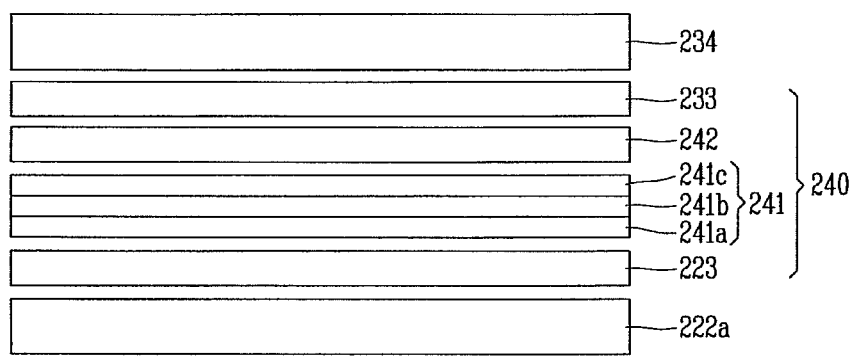
FIG. 6 is a conceptual diagram illustrating a lamination structure of a barrier panel, refractive portion, and main liquid crystal panel of the display module related to an embodiment of the present invention.

FIG. 6 is a conceptual diagram illustrating a lamination structure of the barrier panel 230 (see FIG. 5A), refractive portion 240, and main liquid crystal panel 220 (see FIG. 5A) of the display module related to an embodiment of the present invention.

The refractive portion 240, which is formed of a plurality of layers, includes at least one glass substrate 223 and 233. Additionally, it may include an adhesion layer 242 or a polarization layer 241. The refractive portion 240 is disposed between the main liquid crystal panel and the barrier panel. More specifically, the refractive portion 240 is disposed between the color filters 222a of the main liquid crystal panel and the liquid crystal layer 234 on which the barriers of the barrier panel are formed.

The glass substrate 223 and 233 may be the second substrate 223 of the main liquid crystal panel or the first barrier substrate 233 of the barrier panel.

In general, in the design of a stereoscopic image display using a parallax barrier, the viewing distance D (see FIG. 4) is proportional to the rear distance S (see FIG. 4), and inversely proportional to the pitch P (see FIG. 4) of a pixel. In an example, provided that the interocular distance between the left and right eyes of the observer 10 is 65 mm, the stereoscopic image display can be designed by the following Equation:

$$D=S[(E+P)/P]$$ [Equation 1]

The rear distance calculated by Equation 1 is as shown in the following Table 1:

TABLE 1

| display panel size | resolution | rear distance (refractive index) | rear distance (refractive index: 1.5) |
|---|---|---|---|
| 10" | XGA(1024*768) | 0.70 mm (1.8) | 0.58 mm |
|  | WXGA(1280*800) | 0.63 mm (1.9) | 0.50 mm |
| 8.9" | XGA(1024*768) | 0.62 mm (1.8) | 0.52 mm |
|  | WXGA(1280*800) | 0.56 mm (1.9) | 0.44 mm |

As shown in the above table, in a 10-inch display panel, when the refractive index of the refractive portion 240 is 1.5, the viewing angle is 380 mm, and the resolution is WXGA (1280*800), the rear distance is only 0.50 mm. If at least one glass substrate 223 and 233, the polarization layer 241, and the adhesion layer 242 are formed within the above rear distance, each of the components do not have sufficient thickness. Especially, the glass substrate 223 and 233 does not have sufficient rigidity, and therefore is easily damaged. This drawback acts as a barrier element because it causes limitations in designing a terminal.

In order for the glass substrate 223 and 233 to have sufficient rigidity, it must have a rear distance of at least 0.55 m. Also, if the rear distance is 0.75 mm or greater, it is difficult to make a terminal smaller in size. Accordingly, as shown in Table 1, the refractive index of the refractive portion 240 is preferably 1.8 or more. With a refractive index of 2.3 or more, the resolution of a three-dimensional object may be lowered, and the thickness of the body of a terminal may be increased, which is contrary to the trend of small-sized terminals. Therefore, at least one of the plurality of layers constituting the refractive portion have a refractive index of $1.8 \leq n \leq 2.3$ so that the refractive portion can have a high refractive index as described above.

In order to increase the refractive index of the glass substrate 223 and 233, it has to contain at least $Nb_2O_5$, BaO, and $TiO_2$. Here, if the glass substrate 223 and 233 contains 40 to 50% by weight of $Nb_2O_5$, 17 to 26% by weight of BaO, and 1 to 6% by weight of $TiO_2$, the glass substrate 223 and 233 may have a refractive index of 1.8 or more.

The refractive portion 240 may further include at least one polarization layer 241. Because of this, the overall refractive index of the refractive portion 240 may be designed such that optimum resolution and higher viewing angle can be achieved.

In order to increase the refractive index of the polarization layer 241, the polarization layer 241 includes at least one intermediate layer 241b of an inorganic material. Different layers 241a and 241c of an organic or inorganic material may be formed above and below the intermediate layer 241b. The intermediate layer 241b of an inorganic material requires sufficient thickness because it may be provided with fine grooves without substantially exposing the substrate surface. In an example, the intermediate layer 241b may have a thickness of less than 10 μm, preferably less than 5 μm, more preferably, less than 1 μm.

The intermediate layer 241b may be preferably a silicon oxide, a metal oxide, or a compatible mixture and/or combination thereof. That is, the inorganic intermediate layer 241b may be formed by a material selected from the group consisting of SiO, $SiO_2$, $Al_2O_3$, $ZrO_2$, $TiO_2$, $GeO_2$, and mixtures and combinations thereof.

As such, the polarization layer 241 and the intermediate layer 241b, which are formed of an inorganic material as described above, can have a strong bond with the glass substrate 223 and 233 made of especially $SiO_2$, an inorganic glass material, and an organic polymer material. This leads to an increase in the overall refractive index of the refractive portion 240.

The refractive portion 240 may further include at least one adhesion layer 242. Because of this, the overall refractive index of the refractive portion 240 may be designed such that optimum resolution and higher viewing angle can be achieved.

The adhesion layer 242 may be formed of an organic or inorganic adhesion layer containing glass fibers.

The inorganic adhesion layer has a thickness in the range of 100 nm to 2☐, more preferably in the range of 200 nm to 1 μm. A material for forming the inorganic adhesion layer may be a silicon compound such as $SiO_2$, SiN, etc. or an aluminum compound such as $Al_2O_3$ so that the inorganic adhesion layer has a minimum refractive index of 1.5 or more.

Besides, a material for the organic adhesion layer may include thermoplastic resin (acrylic resin), polyester resin (polyethyleneterephthalate, etc.), methacrylic acid resin, polyamide resin, polyimide resin, polyetherimide resin, polyacetal resin, polyethersulfone, polyvinyl alcohol and a derivative thereof (polyvinyl butyral, etc.), polyphenylene ether, norbornene resin, isobutylene-maleic anhydride copolymer resin, cyclic olefin resin), non-photosensitive thermosetting resin (alkyd resin, aromatic sulfonamide resin, urea resin, melamine resin, benzoguanamine resin), or photosetting resin. Each of these materials has a refractive index of at least 1.5.

As described above, the above-described display module and a mobile terminal including the same are not limited to the configuration and method of the embodiments described as above, but the embodiments may be configured by selectively combining all the embodiments or some of the embodiments so that various modifications can be made.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A display module comprising:
   a liquid crystal panel having a plurality of pixel regions formed on a surface of the liquid crystal panel to display information;
   a barrier panel spaced a predetermined distance from the surface of the liquid crystal panel, the barrier panel covering the surface of the liquid crystal panel; and
   a refractive portion between the barrier panel and the liquid crystal panel, the refractive portion including a plurality of layers, and the refractive index (n) of at least one of the layers of the refractive portion is $1.8 \leq n \leq 2.3$,
   wherein the at least one layer of the refractive portion is a glass layer that contains 40% to 50% by weight of $Nb_2O_5$, 17% to 26% by weight of BaO, and 1% to 6% by weight of $TiO_2$,
   wherein the barrier panel includes a plurality of barriers to cover at least part of a plurality of color filters forming the pixel regions, and the plurality of barriers are spaced apart from each other at intervals so as to define slits,
   wherein a distance (d) from the color filters to the barriers is $0.55 \text{ mm} \leq d \leq 0.75 \text{ mm}$.

2. The display module of claim 1, wherein the refractive portion further having a polarization layer, and the polarization layer includes an inorganic material.

3. The display module of claim 2, wherein the inorganic material is formed by a material selected from at least one of the group consisting of SiO, $SiO_2$, $Al_2O_3$, $ZrO_2$, $TiO_2$, and $GeO_2$.

4. The display module of claim 1, wherein the refractive portion further includes an adhesion layer.

5. The display module of claim 1, wherein the barrier panel includes a barrier electrode to switch between a three-dimensional mode of the display module and a two-dimensional mode of the display module, wherein the barrier electrode to receive a signal to block light at the barrier panel in the three-dimensional mode, and the barrier electrode to be non-driven in the two-dimensional mode such that light passes through the barrier panel.

6. A mobile terminal comprising:
   a terminal body; and the display module of claim 1 provided in the terminal body.

7. A mobile terminal comprising:
a terminal body;
a liquid crystal panel in the terminal body, and the liquid crystal panel having a plurality of color filters spaced apart from each other to define pixels;
a barrier panel that includes a plurality of slits and a plurality of barriers, the plurality of slits to pass light from the display panel, and the plurality of barriers to provide a perceived three-dimensional (3D) image; and
a refractive portion between the liquid crystal panel and the barrier panel, wherein the refractive portion includes a plurality of layers, and the refractive index (n) of at least one of the layers of the refractive portion is $1.8 \leq n \leq 2.3$,
wherein the at least one layer of the refractive portion is a glass layer containing 40% to 50% by weight of $Nb_2O_5$, 17% to 26% by weight of BaO, and 1% to 6% by weight of $TiO_2$.

8. The mobile terminal of claim 7, wherein the plurality of layers includes a polarization layer having an inorganic material.

9. The mobile terminal of claim 8, wherein the inorganic material is formed by a material selected from at least one of the group consisting of SiO, $SiO_2$, $Al_2O_3$, $ZrO_2$, $TiO_2$, and $GeO_2$.

10. The mobile terminal of claim 7, wherein the plurality of layers includes an adhesion layer.

11. The mobile terminal of claim 7, wherein a distance (d) from the color filters to the barriers is $0.55 \text{ mm} \leq d \leq 0.75 \text{ mm}$.

12. The mobile terminal of claim 7, wherein the barrier panel includes a barrier electrode to switch between a three-dimensional mode and a two-dimensional mode, wherein the barrier electrode to receive a signal to block light at the plurality of barriers in the three-dimensional mode, and the barrier electrode to be non-driven in the two-dimensional mode such that light passes through the barrier panel.

13. The mobile terminal of claim 7, further comprising a backlight on one side of the liquid crystal panel, wherein the liquid crystal panel is between the backlight and the barrier panel.

14. A mobile terminal comprising:
a terminal body;
a liquid crystal panel in the terminal body, and the liquid crystal panel having a plurality of color filters to define a plurality of pixels;
a barrier panel including a plurality of slits and a plurality of barriers, the barrier panel to pass light in a two-dimensional mode and to block a portion of the light in a three-dimensional mode, wherein, in the three-dimensional mode, light from the liquid crystal panel to pass through the plurality of slits and light to be blocked by the plurality of barriers;
a refractive portion between the liquid crystal panel and the barrier panel, wherein the refractive portion includes a plurality of layers, and the refractive index (n) of at least one of the layers of the refractive portion is $1.8 \leq n \leq 2.3$; and
a backlight to provide light to the liquid crystal panel,
wherein the at least one layer of the refractive portion is a glass layer containing 40% to 50% by weight of $Nb_2O_5$, 17% to 26% by weight of BaO, and 1% to 6% by weight of $TiO_2$.

15. The mobile terminal of claim 14, wherein the barrier panel further includes a barrier electrode to switch between the three-dimensional mode and the two-dimensional mode, wherein the barrier electrode to receive a signal to block light in the three-dimensional mode, and the barrier electrode to remain non-driven in the two-dimensional mode such that light passes through the barrier panel.

16. The mobile terminal of claim 14, wherein a distance (d) from the color filters to the barriers is $0.55 \text{ mm} \leq d \leq 0.75 \text{ mm}$.

* * * * *